UNITED STATES PATENT OFFICE.

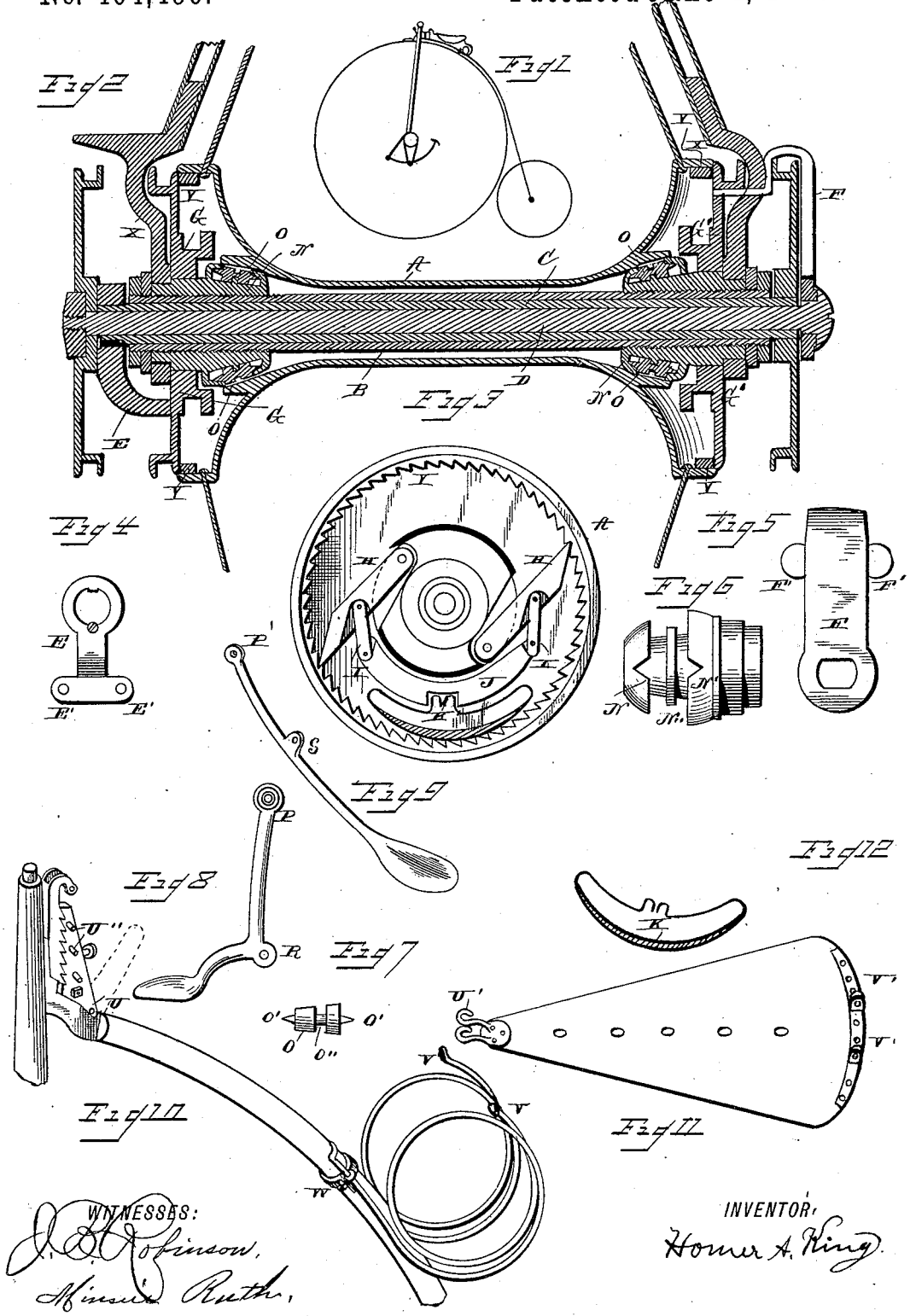

HOMER A. KING, OF SPRINGFIELD, MASSACHUSETTS.

VELOCIPEDE.

SPECIFICATION forming part of Letters Patent No. 404,490, dated June 4, 1889.

Application filed October 22, 1888. Serial No. 288,735. (No model.)

*To all whom it may concern:*

Be it known that I, HOMER A. KING, a citizen of the United States, residing at Springfield, in the county of Hampden and State of Massachusetts, have invented a new and useful Improvement in Velocipedes and Bearings, of which the following is a full description, the accompanying drawings making a part of this specification.
My invention relates to an improved construction on my former applications by the arrangement of a stationary tubular shaft, improvements in brake-connections, in the connections between the propelling-drums and the inner shafts, and an improvement of the anti-friction roller-bearings and case; also the improved saddle-spring and forward adjustment.

Referring to the drawings, corresponding letters of reference refer to corresponding parts.

Figure 1 is a side elevation view of my bicycle. Fig. 2 is a sectional view of the hub, shafts, fork-rests, drums, connections, and roller-bearings of the front wheel of my improved bicycle. A represents the hub; B, the stationary tubular shaft; X, the fork-rests; C, the tubular connecting-shaft which revolves back and forth by its fixed spline-connection with the retracing-drum M' and by the splined connection E (see also Fig. 4) with the propelling-drum G. D is the central shaft, which revolves back and forth by its firm flattened fitting in retracing-drum M, and by a similar fitting in the connection F (see also Fig. 5) with the propelling-drum G'. N is the tubular roller-case. (Shown also in Fig. 6.) O are the rollers. (See also Fig. 7.) K' is the connection, (shown also in Fig. 3,) being a part of the frictional spring-collar K, working in a groove in each of the retracing-drums M and M'. Y are the ratchet-rims, secured to the hub A. (Shown also in Fig. 3.)

Fig. 3 is a cross-section of Fig. 2 in the line 1 1, showing the hub A, ratchet-rim Y, and dogs H H, with connections I I to J moved back and forth by K, which is a friction-spring to throw the dogs H H out of or into the teeth of the ratchet Y, J' oscillating enough to allow J to move far enough to throw the dogs H H in or out, forming a perfect silent ratchet mechanism acting quickly, the dogs being in the ratchet at one end of the hub while the lever is descending and out at the other end while the lever there is rising; or all the dogs are out when held half-way between the extremes of their motion, making a silent ratchet. A little experience will enable the rider to adjust the dogs by a slight pressure of one foot upon a pedal to avoid all noise of the ratchet in coasting.

Fig. 4 is an end view of the connection E, (shown in Fig. 2,) connecting rigidly with the shaft C, and the propelling-drum G, with side projections E' to give it strength and to enable it to be screwed fast to the propelling-drum G.

Fig. 5 is an end view of F, (shown in Fig. 2,) rigidly connecting the shaft D with the propelling-drum G', with projections F' and F' to brace against the drum G', but not to receive screws, as F is secured by a screw through the chain-groove of drum G'.

Fig. 6 is a view of the grooved tubular adjustable case for holding my latest improved roller-bearings for velocipedes and other bearings, but may be made solid with the axle on the inner end of the bearing for two and four wheeled vehicles or other bearings. The lips project inward from either side over the points of the rollers at the ends, except at N' and N', where they are cut away to drop the rollers in until the case is full and ready to insert in the hub. When in place, the rollers do not touch the lips of the case, but only on the bearing-surfaces and on inner edge of the elevation N'', as there is a slight tendency of the rollers to work outward. The case can be threaded to be secured on shaft B.

Fig. 7 shows one of my latest improved rollers with elongated center O' at each end to hold the rollers in the case when taken out of the hub, and with the groove O'', which should be nearer the larger end than the center, to bring the end pressure against the elevation N'' on the case as near the center of the roller endwise as possible, as any end pressure at or nearer one end than the other tends to bind the easy movement of the rollers, as when the case and rollers are properly constructed the rollers touch the hub only on the two roller-surfaces and the case only on these surfaces and on the inner end of the longer surface as it presses slightly against the elevation N″ of the case N, but not enough to cause injury even when a carriage is not oiled for months.

Fig. 8 shows the brake-foot with fulcrum-support R and round opening P for the reception of the ball end P′ of the lever, forming a ball-joint.

Fig. 9 shows the brake-lever, with fulcrum S, to be attached to the handle by a clip, and with the ball P′, which forms a nice ball-joint and works nicely.

Fig. 10 shows the adjustable saddle-spring, made of one piece of coiled steel rod secured to the backbone by the adjustable clip W, and with ends bent backward at V V to hook into the holes v′ V′ in the metal brace, Fig. 11, to support the rear end of the saddle. Fig. 10 also shows my improved neck with projecting pins U″, over which to hook U′ of Fig. 11 at any desired height for the front support of the saddle.

Fig. 12 shows the friction-spring K, with connecting oscillating part J and connections I I to dogs H H, which are pivoted in the propelling-drums, so that whenever the propelling-drums move forward faster than the hub A or ratchet Y, the dogs H H are thrown into the ratchet Y, and whenever the hub A and ratchet Y are moving forward or around forward faster than the propelling-drums the spring K and connections throw the dogs H H out of connection, making a silent ratchet, and the propelling-drums G and G′ are moved forward by the depression of their respective levers. When the propelling-drum G moves forward or backward by the connection E, secured rigidly to the shaft C, the movement carries the shaft C and retracing-drum M′ in the same direction, as the drum M′ is secured rigidly by spline to shaft C, and as the chain from drum M′ is on the rear down to the lever the lever is raised or lowered when the other lever is depressed or raised by the depression of the lever connected to M′. As connection F unites propelling-drum G′ to shaft D rigidly, and shaft D is rigidly secured to retracing-drum M, the movement is just the reverse of the other, the depression of one lever raising the other lever.

Having thus described my invention, what I claim as new, and desire to secure by Letters Patent, is—

1. The stationary tubular shaft B, with the fork-rests secured at each end by nuts, all inside of or between two outer retracing-drums.

2. A stationary tubular shaft inclosing two shafts arranged to revolve in opposite directions and bearing or encircled by only one revolving drum at each end.

3. The connection E, with one or more side projections, as E′, for the purpose set forth.

4. The connection F, with one or more side projections, as F′, for the purpose set forth.

5. A roller-case with lips projecting to inclose elongations on the ends of roller-bearings, and with an opening on one or both lips through which to insert the rollers.

6. A roller-case with projecting lips to inclose the elongated ends of rollers with an elevation, as N″, to hold in position and receive the end pressure of inclined rollers encircled by a central groove.

7. An inclined roller-bearing having two bearing-surfaces separated by a groove and with the bearing-surface on the smaller end broader than on the larger end, for the purpose set forth.

8. An inclined roller having two bearing-surfaces separated by a groove and an elongation at each end, for the purpose set forth.

9. The friction-spring K, doubled or thickened where wearing and bearing on a rotating part and with connection to J, for the purpose set forth.

10. The dogs H H, with connections I I to J and K, for the purposes set forth.

HOMER A. KING.

Witnesses:
RALPH W. ELLIS,
WILLIAM ORR, Jr.